Sept. 18, 1951    R. S. REYNOLDS    2,568,463
METHOD OF ADHERING METAL FOIL
TO NONMETALLIC CARRYING WEBS
Filed Oct. 23, 1946    2 Sheets-Sheet 1

INVENTOR
Richard S. Reynolds
BY
Pennie, Edmonds, Morton & Barrows
ATTORNEYS

Sept. 18, 1951  R. S. REYNOLDS  2,568,463
METHOD OF ADHERING METAL FOIL
TO NONMETALLIC CARRYING WEBS
Filed Oct. 23, 1946  2 Sheets-Sheet 2
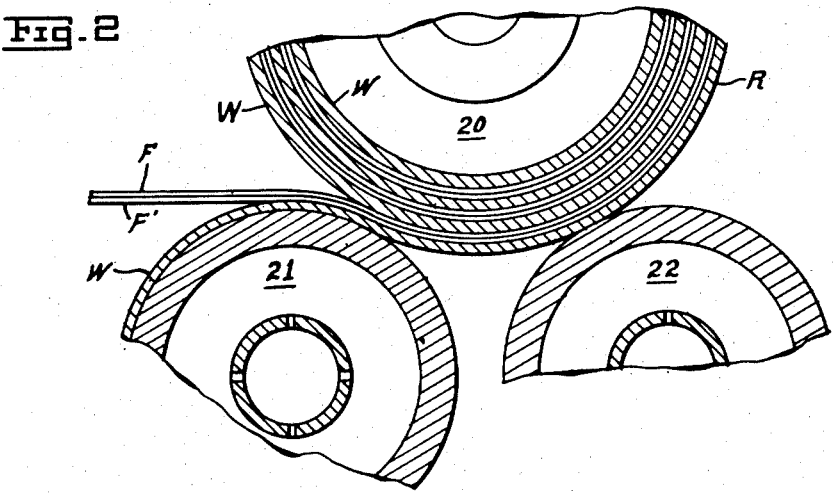
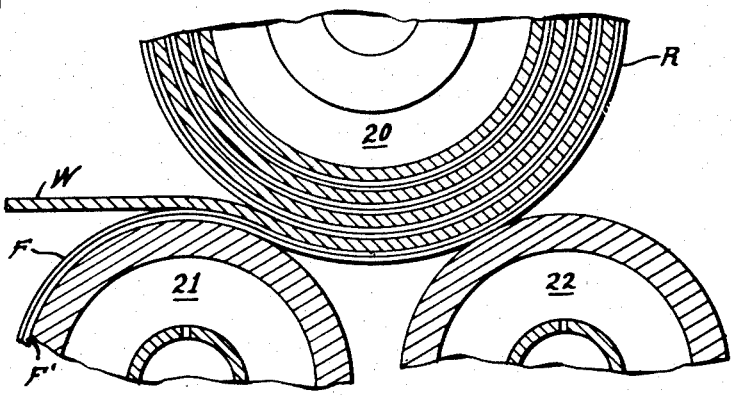
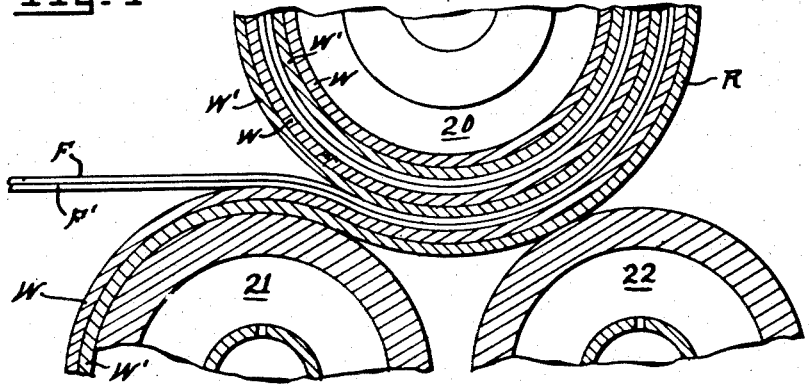
INVENTOR
Richard S. Reynolds
BY
Pennie, Edmonds, Morton & Barrows
ATTORNEYS Patented Sept. 18, 1951

2,568,463

UNITED STATES PATENT OFFICE 2,568,463

METHOD OF ADHERING METAL FOIL TO NONMETALLIC CARRYING WEBS

Richard S. Reynolds, Richmond, Va., assignor to Reynolds Metals Company, Richmond, Va., a corporation of Delaware Application October 23, 1946, Serial No. 705,175

9 Claims. (Cl. 154—117)

This invention relates to the production of laminated articles and has for its object the provision of an improved method of laminating webs of metal foil to other webs in the production of duplex or triplex laminated articles. This application is a continuation-in-part of my Patent No. 2,428,385.

My invention provides an improved method of bonding double-foil webs of metal to another web which, for convenience, I shall call the "carrying web." The double-foil webs used in my invention consist of two metal foils in face-to-face contact, such as result from rolling together two sheets of metal. Aluminum has the properties of producing foils advantageously useful in the invention which may, if desired, be rolled to exceeding thinness, and yet separated efficiently when handled in accordance with the invention. The carrying web may be of such materials as paper, fabrics such as cloth, cellulosic materials such as regenerated cellulose, cellulose acetate, nitrocellulose, and the like, or webs of metal foil.

My invention provides an improved method of manipulating a double-foil web consisting of two foils in face-to-face contact and at least one carrying web so as to effect a bonding of at least one of the foils to the carrying web while the foils are in mutual supporting contact, face-to-face. While my invention is applicable to the use of foils of various thicknesses, it is advantageously applicable to the thin and relatively delicate foils. Thus, in accordance with my invention, I may bond to a carrying web aluminum foil, for example, down to 0.0003 inch in thickness (approximately 253 square feet per pound) at high speed.

My invention provides a method of utilizing coils or rolls of double-foil webs, without unwinding and separating the foils into separate webs, in forming a laminated article while the foils are still in face-to-face relation. The foils provide mutual support for each other until the bonding of at least one foil to the carrying web has been effected.

In one aspect of my invention, I pass the double-foil web to a rewinding operation while bringing it into contact with a carrying web, wind the contacting webs together with an adhesive material interposed between the foils and the carrying web and bond one of the foils to each exterior surface of the carrying web. I may apply an adhesive material to the exteriors of the double-foil web, or to the exteriors of the carrying web or webs, or use one or two carrying webs previously coated with adhesive material. Any suitable adhesive material may be used, such as one of adhering consistency containing a solvent, like a water-soluble glue, for example casein, animal glue, silicate of soda, or a material which becomes adhesive on heating (thermoplastic) such as asphalt, resins, wax, gums and shellac, plasticized ethyl cellulose, nitro-cellulose or vinylite. In using liquid dissolved adhesives, the solvent is preferably removed by evaporation before the webs are brought together as, for example, by circulating heated air over the coated web. I have found it advantageous to use adhesives dissolved in easily volatilized organic solvents, for example, adhesives that polymerize after contact. The thermoplastic adhesives may be heated to adhesive consistency as by conduction while in contact with hot rolls, by radiant heaters, by heated air, or by electronic heating, and the laminated sheet is preferably cooled as soon as practicable after contact, to set the adhesive.

In one embodiment of my invention in which I form a triplex laminated sheet, I bring one surface of the carrying web into adhering contact with an exterior surface of one of the foils of the double-foil web, then wind the two webs while together into a single roll, and as the roll rotates, the other foil is subsequently brought into adhering contact with the opposite face of the carrying web, resulting in the carrying web being interposed between the two foils. I am able to roll together as a unit a double-foil web and a carrying web, with interposed adhesive, with the carrying web either interior or exterior on each convolution of the roll, whereby the foils and carrying web are bonded together as a triplex article without separating the foils. In a present preferred embodiment of my method, I apply adhesive material between the contacting surfaces of the webs and effect adhesion in two stages, one adhesion on the initial contact of one surface of the carrying web with one foil, and the other adhesion of the other surface of the carrying web and other foil on the last-formed convolution of the roll.

In the method just described for forming a triplex laminated article, I may use, instead of one carrying web, two carrying webs in face-to-face contact, with the result that one foil is bonded to one carrying web while the other foil is bonded to the other carrying web and while the webs, respectively, are still face to face. Thereafter, the resulting two duplex laminated articles are separated while unwinding the roll.

When webs of aluminum, for example, are rolled together to form a double-foil web, the exterior surfaces which contact the rolls are polished by the rolls while the inside surfaces have matt finishes. The matt surfaces are more desirable for bonding to other material and the polished surfaces are usually more desirable for the exteriors of the laminated articles. I prefer, therefore, to reverse the positions of the two foils before bonding them to the carrying web. In reversing the two foils, I prefer to turn the exterior foil back one revolution of the roll, place it in face-to-face contact with the interior foil and then unwind the roll, thus reversing the positions of the two foils, placing the polished surfaces face-to-face. This method of reversing the two foils is described and claimed in my copending application Serial Number 677,385, filed June 17, 1946, now Patent No. 2,529,884. This invention comprises a combination of the step of reversing the positions of the two foils and the bonding of at least one of the foils to a carrying web while the foils are face-to-face. My invention contemplates the use of rolls of double-foil webs with either the polished or the matt surfaces face-to-face.

These and other novel features of the invention will be better understood after considering the following description taken in conjunction with the accompanying drawings, in which:

Figs. 2, 3 and 4 are enlarged fragmentary schematic views showing different ways in which the double-foil web is brought into contact with the opposite sides of carrying webs.

Figure 1:
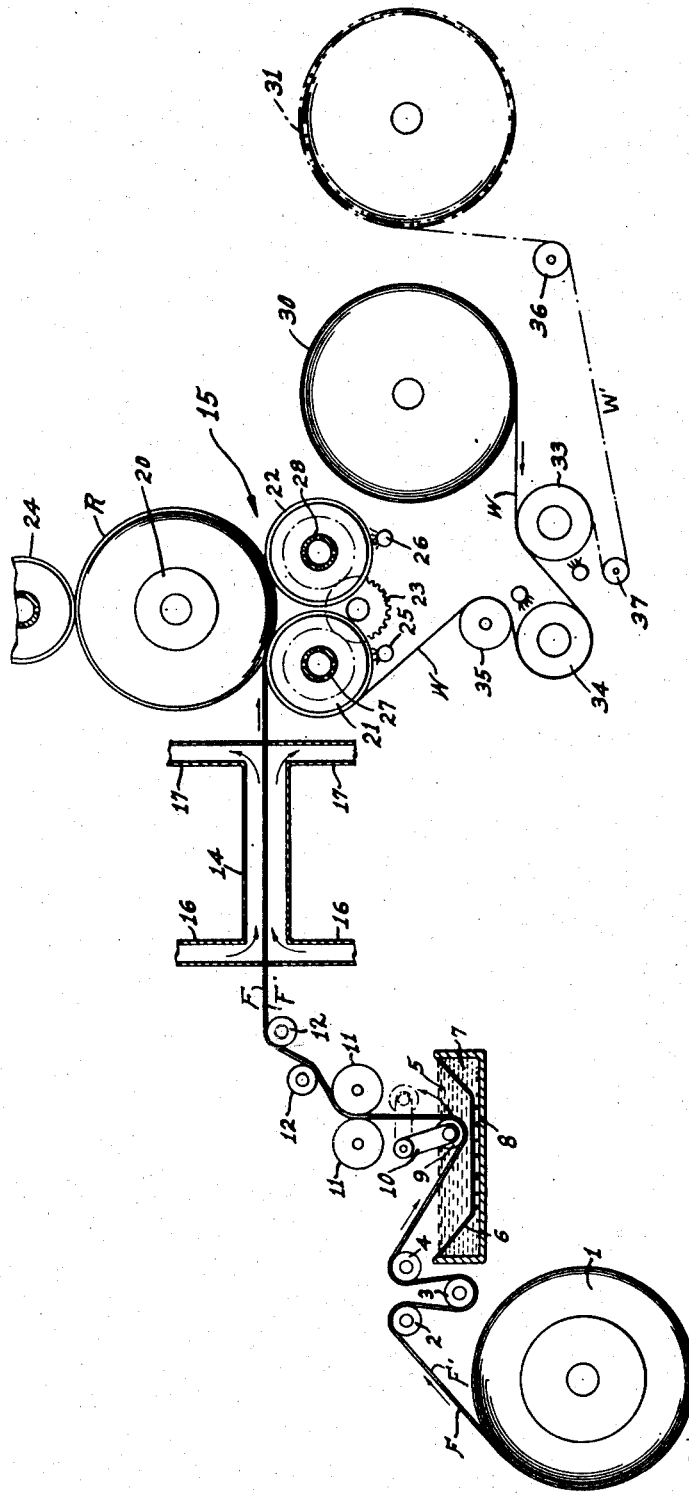
Fig. 1 illustrates, more or less diagrammatically, in side elevation, one form of apparatus for carrying my method into effect.

In carrying out a method of the invention with the apparatus illustrated in Fig. 1, the coil or roll 1, supported on suitable bearing means, is formed of a single double-foil web consisting of two foils F and F' in face-to-face contact such as results from rolling two sheets of metal together. The polished surfaces of the foils in the roll are usually in exterior positions but these may be reversed, when so positioned, to an interior position, if desired, as the roll is unwound. In order to place the adhesive on the matt surfaces, the foils are reversed in unwinding the roll as described in my said application.

The double-foil web passes over idler roller 2, tension roller 3, direction or guide roller 4, and into the bath of liquid adhesive 5 in vessel 6. The fluid 7 between the vessel 6 and jacket 8 may be heated in any suitable manner to heat the adhesive to the desired temperature indirectly. For example, the liquid 7 may be circulated to a heater or steam may be supplied from a suitable source.

The roller 9 on the swing arm 10 is for guiding the web through the adhesive and may be swung out of the bath as shown in broken lines in starting the operation. After leaving the adhesive, the web passes upward between two metering rollers 11, which have micrometer adjustment for clearance, to regulate the thickness of coating and then over two spreader bars 12 to smoothen out the adhesive.

In those instances where the adhesive is dissolved in a solvent which is to be removed before the foil contacts the other web, the double-foil web is passed, preferably in a more or less horizontal position, through a heating chamber 14 before passing to the rewind apparatus 15. The particular kind of heating used depends upon the particular kind of adhesive material used. In using adhesive materials comprising, for example, a polymerizable resin in a volatile solvent, such as mixtures of polyvinyl acetate and glyptol dissolved in acetone, the heater 14 is one advantageously provided with means for the circulation therethrough of hot air to evaporate the solvent and remove it by exhaust, leaving the polymerizable resin on the web in a suitably plastic condition. Hot air is preferably blown in through the inlet pipes 16 to evaporate the solvent, in which case the air serves also to support or float the webs, and is removed through exhaust pipes 17. Other heaters of the type commonly used for drying and baking paints and lacquers may also be used in place of the heater 14.

Some forms of adhesive material which are rendered thermoplastic in the vessel 6 do not require heating as in the heater 14 and the double-foil web may be passed directly from bars 12 to the rewind apparatus. Adhesives such as waxes, gums, asphalts, thermoplastic resins and the like may be sufficiently heated in vessel 6 and are preferably cooled immediately after the bonding, as will be described hereinafter.

The double-foil web with adhesive on each exterior surface and at the proper adhesive consistency is led to the rewind apparatus 15. Any suitable form of rewind apparatus, preferably with a power-driven pressure roller, such as those now commonly used, may be employed. The apparatus illustrated comprises a rewind roller 20 mounted in guides (not shown) permitting it to float up and down above the supporting rollers 21 and 22 which are driven by the gear 23 at the same peripheral speed. The roll R of laminated webs wound on the roller 20 rests upon rollers 21 and 22 and is driven at a uniform peripheral speed throughout the winding operation. The pressure roller 24 bears upon the roll R and is driven in unison with rollers 21 and 22. The supporting rollers may be heated externally by the burners 25 and 26, or otherwise, whenever it is desired to increase the temperature of the adhesive applied to the webs. The supporting rollers are preferably mounted on hollow shafts 27 and 28 by means of which a cooling fluid may be circulated internally to cool the rollers and the adhesive material on the webs whenever that is desired.

A carrying web W is supplied from either rolls 30 or 31. In forming a triplex laminated sheet, only one of these rolls is used, for example roll 30. The carrying web W from roll 30 is passed successively over rollers 33, 34 and 35 to supporting roller 21. The rollers 33 and 34 are preferably heated in any suitable way, for example as the rollers 21 and 22 are heated. On the surface of roller 21, web W contacts the adhesively coated surface of foil F' and is attached or bonded thereto. As the two webs so bonded together travel with roller 21 and are wound into roll R, the other surface of web W is brought into adhesive contact with foil F. This contacting of the webs is illustrated in Fig. 2. As a result of the operation just described, a triplex laminated article is produced having a core of carrying web and exteriors of metal foil.

I may use two carrying webs in face-to-face contact instead of the single web W, in which case I bring the web W' from roll 31 down over guide roller 36, over tension roller 37 and into contact with web W on the periphery of roller 33, thereby combining the two webs in face-to-face contact. In carrying out the operation previously described, the web W becomes bonded to foil F' on initial contact and the web W' becomes bonded to F after the rewind roll R has made approximately one complete rotation thereafter. When the rewind roll R is unwound, two separate duplex laminated articles may be separated at the surfaces of contact between webs W and W', each consisting of one carrying web with one surface having foil bonded thereon. This form of operation is illustrated in Fig. 4.

The arrangement of apparatus illustrated in Fig. 1 may be used to carry out another form of my invention. I may place the roll of carrying web in the position of the roll of double-foil web 1 and run the web W through the bath of liquid adhesive and through the heater 14, if required, exactly as in passing through the double-foil web F and F'. In this adaptation of the invention, the roll 1 is placed in the position of roll 30 and the double-foil web passed over rollers 33, 34 and 35 to support roller 21 in the same manner as the web W. In this modified form of operation, the adhesive material is supplied to the carrying web W. The contacting of the webs in this form of operation is illustrated in Fig. 3.

In still another adaptation of my invention, I may dispense with the entire adhesive applying means 5 to 12, in which case I use a web previously coated with a dry thermoplastic adhesive such as a suitably plasticized ethyl acetate or nitrocellulose of types widely used in the bonding of sheet material. For example, I may place rolls of carrying web W so coated in the position of roll 1. This web, coated with the dry thermoplastic adhesive material, is passed directly from the roller 4 to and through the heater 14 to heat the thermoplastic to suitable adhesive consistency before it contacts the double-foil web passing from the position of roll 30 over the supporting roller 21. When using such thermoplastic materials, I may cool rollers 21 and 22 to effect a rapid setting of the adhesive. The dry thermoplastic adhesive on the web may be heated by passing the web through heated gases or by radiations from radiant heaters placed in the heater 14 or by any suitable means.

In using thermoplastic adhesives which should be cooled and set soon after contacting, the supporting rollers 21 and 22 are cooled by circulating a cooling fluid therethrough from the hollow shafts. Other forms of adhesives which have a continuing polymerization may require heating, in which case either a heated fluid is circulated through the rollers 21 and 22 or they are heated externally by the burners 24 and 25.

In using, for example, a carrying web of paper and a water soluble glue on foils F and F', it is important to eliminate as much of the water as is necessary before bonding. To this end, I may heat such rollers as 33 and 34 to drive out much of the contained moisture in the paper. I also evaporate some of the water in heater 14. The dry paper containing, say, 8% of moisture, will reabsorb the moisture remaining in the glue and prevent the objectionable results of an undue amount of water being trapped between the two foils when triplex laminated articles are produced.

I claim:

1. The method of producing laminated articles having metal laminations therein comprising coating a double-foil metal web consisting of two metal foils in face-to-face contact with an adhesive to coat the outer surfaces of the double-foil metal web with a film of adhesive material, contacting one adhesive coated double-foil surface to a non-metallic carrying web to effect a cemented or adhesive bond therebetween, winding said double-foil having one surface cemented to said carrying web upon a roller, effecting a cemented bond between the uncemented surface of the carrying web and the unbonded adhesive film of said adhesive coated double-foil, thereby producing a laminated product comprising a non-metallic carrying web having a pair of metal foils each adhesively cemented to one of the outer surfaces of said non-metallic carrying web.

2. The method of producing a laminated product having a metal lamination therein comprising feeding a double-foil metal web consisting of two metal foils in face-to-face contact, applying adhesive material to both surfaces of said double-foil, bonding a double-carrying web to one surface of the double-foil, winding said one surface bonded double-foil into a roll thereby bonding the unbonded surface of the double carrying web to the unbonded adhesive coated surface of the double-foil metal web, whereby two duplex laminated articles are produced each having a metal foil bonded to a non-metal carrying web.

3. The process of claim 1 wherein the adhesive is a solvent soluble adhesive.

4. The process of claim 1 wherein the adhesive is a thermo-plastic material.

5. The process of claim 2 wherein the solvent is a solvent soluble-adhesive.

6. The process of claim 2 wherein the adhesive is a thermo-plastic material.

7. A method of making laminated articles comprising the steps of bonding a first surface of a double-foil metal web consisting of two metal foils in face-to-face contact to a first surface of a non-metallic carrying web, winding said bonded webs into a roll so as to bring the other surface of the carrying web into contact with the other surface of said double-foil web, and bonding said other surface of the carrying web to said other surface of the double-foil web, whereby said metal foils are bonded to opposite surfaces of said carrying web.

8. A method as recited in claim 7 and including the step of unwinding the webs from the roll whereby the metal foils will be separated and will adhere to the opposite surfaces of the carrying web.

9. A method as recited in claim 7 wherein said carrying web comprises two superimposed non-metallic sheets in face-to-face contact and including the steps of unwinding the webs from the roll whereby the metal foils will be separated and each will adhere to an outer surface of a respective one of said sheets, and separating the sheets so as to provide two laminated articles each comprising a non-metallic sheet having a metal foil bonded thereto.

RICHARD S. REYNOLDS.

REFERENCES CITED

The following references are of record in the file of this patent:

UNITED STATES PATENTS

| Number | Name | Date |
|---|---|---|
| 1,211,867 | Moony | Jan. 9, 1917 |
| 1,474,202 | Macdonald | Nov. 13, 1923 |
| 1,490,891 | Fichtmueller | Apr. 15, 1924 |
| 1,694,258 | Hartong | Dec. 4, 1928 |
| 1,820,050 | Crowell | Aug. 25, 1931 |
| 2,030,135 | Carpenter | Feb. 11, 1936 |
| 2,069,257 | Mahler et al. | Feb. 2, 1937 |
| 2,330,530 | Tuttle | Sept. 28, 1943 |